(12) United States Patent
Kim

(10) Patent No.: US 11,265,223 B2
(45) Date of Patent: Mar. 1, 2022

(54) SLAVE MODULE AND NUMBER ASSIGNMENT SYSTEM INCLUDING THE SAME

(71) Applicant: Samsung SDI Co., Ltd., Yongin-si (KR)

(72) Inventor: Sunmin Kim, Yongin-si (KR)

(73) Assignee: Samsung SDI Co., Ltd., Yongin-si (KR)

(\*) Notice: Subject to any disclaimer, the term of this patent is extended or adjusted under 35 U.S.C. 154(b) by 10 days.

(21) Appl. No.: 16/659,315

(22) Filed: Oct. 21, 2019

(65) Prior Publication Data

US 2020/0169466 A1 May 28, 2020

(30) Foreign Application Priority Data

Nov. 23, 2018 (KR) .................. 10-2018-0146764

(51) Int. Cl.
*H04L 12/24* (2006.01)
*H04L 41/12* (2022.01)
(Continued)

(52) U.S. Cl.
CPC ............ *H04L 41/12* (2013.01); *H04L 12/403* (2013.01); *H04L 2012/40215* (2013.01)

(58) Field of Classification Search
CPC .................. H04L 12/24; H04L 12/403
(Continued)

(56) References Cited

U.S. PATENT DOCUMENTS 7,782,800 B2\* 8/2010 Swain ............... H04L 12/403
370/257
8,436,575 B2\* 5/2013 Sim ..................... H01M 10/482
320/106
(Continued)

FOREIGN PATENT DOCUMENTS

CN 1670717 A 9/2005
CN 101635637 A 1/2010
(Continued)

OTHER PUBLICATIONS

EPO Extended Search Report dated Apr. 7, 2020, for corresponding European Patent Application No. 19209130.4 7 (pages).
(Continued)

*Primary Examiner* — Man U Phan
(74) *Attorney, Agent, or Firm* — Lewis Roca Rothgerber Christie LLP

(57) ABSTRACT

A slave module, connected in series with a master module on a communication line, configured to control switches to sequentially assign identification numbers of the slave module and lower slave modules, the slave module comprising: a first communication line connecting a processor to one of an adjacent upper slave module and the master module; a second communication line connecting an adjacent lower slave module to the first communication line; a switch on the second communication line and configured to control a communication connection between the first communication line and the adjacent lower slave module; and the processor configured to control an operation of the switch based on a signal received from the first communication line, wherein the processor is configured to close the switch when setting of an identification number thereof is completed based on an identification number received from the master module through the first communication line.

8 Claims, 3 Drawing Sheets

(51) Int. Cl.
   *H04L 12/403*    (2006.01)
   *H04L 12/40*     (2006.01)

(58) Field of Classification Search
   USPC ......................................................... 370/257
   See application file for complete search history.

(56) References Cited

U.S. PATENT DOCUMENTS

| | | | |
|---|---|---|---|
| 9,024,584 B2* | 5/2015 | Park ................... | H01M 10/425 |
| | | | 320/116 |
| 9,088,052 B2* | 7/2015 | Sim ..................... | H01M 10/441 |
| 9,436,261 B2* | 9/2016 | Yun ..................... | G06F 1/3212 |
| 10,243,923 B2* | 3/2019 | Jo ....................... | H04L 41/00 |
| 10,374,265 B2* | 8/2019 | Kim ..................... | H01M 10/46 |
| 10,749,220 B2* | 8/2020 | Jeon .................... | H01M 10/425 |
| 10,785,054 B2* | 9/2020 | Lee ..................... | H02J 13/00006 |
| 2009/0146610 A1 | 6/2009 | Trigiani | |
| 2011/0175574 A1 | 7/2011 | Sim et al. | |
| 2011/0273023 A1 | 11/2011 | Nishida et al. | |
| 2014/0091770 A1* | 4/2014 | Lee ..................... | H02J 7/0068 |
| | | | 320/135 |
| 2015/0084598 A1* | 3/2015 | Song .................... | H02J 7/0047 |
| | | | 320/128 |
| 2017/0222275 A1* | 8/2017 | Krishnan ............. | H02J 7/0013 |

FOREIGN PATENT DOCUMENTS

| | | |
|---|---|---|
| CN | 102862487 A | 1/2013 |
| CN | 106547718 A | 3/2017 |
| EP | 2293375 A1 | 3/2011 |
| EP | 2357713 A1 | 8/2011 |
| KR | 10-2014-0143076 A | 12/2014 |
| KR | 10-2015-0011426 A | 2/2015 |
| KR | 10-2015-0033188 A | 4/2015 |
| KR | 10-1854876 B1 | 6/2018 |
| WO | 2010/009584 A1 | 1/2010 |

OTHER PUBLICATIONS

Chinese Office Action, with English translation, dated Dec. 15, 2021, issued in corresponding Chinese Patent Application No. 201911139807.2 (26 pages).

* cited by examiner

SLAVE MODULE AND NUMBER ASSIGNMENT SYSTEM INCLUDING THE SAME

CROSS-REFERENCE TO RELATED APPLICATION

This application claims priority to and the benefit of Korean Patent Application No. 10-2018-0146764, filed on Nov. 23, 2018, in the Korean Intellectual Property Office, the disclosure of which is incorporated herein in its entirety by reference.

BACKGROUND

1. Field

Aspects of one or more example embodiments relate to a slave module system.

2. Description of Related Art

A high-capacity battery system may be mounted on an energy storage device or an electricity-powered vehicle such as an electric vehicle. The high-capacity battery system may include a plurality of battery packs to increase the charge capacity thereof.

In general, the plurality of battery packs may be managed by a master device that manages each battery pack.

In order to distinguish the plurality of battery packs, an identification number may be pre-assigned to each of the plurality of battery packs, and in a related art system, the master device may assign identification numbers of at least one battery pack by using a separate communication line for such an identification number assignment.

However, the use of such a system may lead to not only high manufacturing costs, but also increased hardware complexity, thus causing difficulty in maintenance and management thereof.

The above information disclosed in this Background section is only for enhancement of understanding of the background and therefore the information discussed in this Background section does not necessarily constitute prior art.

SUMMARY

Aspects of one or more example embodiments relate to a slave module system for controlling, by using switches arranged on a communication line where a master module and at least one slave module are connected in series, the switches to sequentially assign identification numbers of the slave module and lower slave modules.

Also, one or more example embodiments relate to an identification number assignment system for sequentially assigning identification numbers of at least one slave module by sequentially controlling switches of the at least one slave module having the switches arranged on a communication line where a master module and the at least one slave module are connected in series.

Some example embodiments may include a system configured to enable identification number assignment and data transmission/reception by using a single communication line, by allowing each slave module to manage the opening/closing of a communication line.

Some example embodiments may include assigning identification numbers of a plurality of slave modules more efficiently.

Some example embodiments may include reducing the hardware complexity of a system including a plurality of slave modules.

Additional aspects will be set forth in part in the description which follows and, in part, will be more apparent from the description, or may be learned by practice of the presented example embodiments of the disclosure.

According to some example embodiments, in a slave module, for controlling, by using switches arranged on a communication line where a master module and at least one slave module are connected in series, the switches to sequentially assign identification numbers of the slave module and lower slave modules, slave module includes: a first communication line connecting a processor to one of an adjacent upper slave module and the master module; a second communication line connecting an adjacent lower slave module to the first communication line; a switch arranged on the second communication line to control a communication connection between the first communication line and the adjacent lower slave module; and the processor controlling an operation of the switch based on a signal received from the first communication line. In this case, the processor may close the switch when setting of an identification number thereof is completed based on an identification number received from the master module through the first communication line.

According to some example embodiments, when a state of the slave module is a certain state, the processor may set the identification number thereof to a first identification number, and may receive an open signal of the switch from the master module, open the switch, and maintain an open state of the switch.

According to some example embodiments, the certain state may be any one of a state within a certain time interval from a time when a power supply of the slave module is changed to an on state and a state in which a signal corresponding to identification number initialization is received from the master module.

According to some example embodiments, when an identification number assignment signal including a second identification number is received from the master module through the first communication line in a state where the switch is opened, the processor may set the identification number thereof to the second identification number, close the switch, and transmit a signal corresponding to completion of identification number setting to the master module through the first communication line.

According to some example embodiments, when the identification number assignment signal is received from the master module, the processor may change and set the identification number thereof to the second identification number only when the identification number thereof is the first identification number.

According to some example embodiments, the processor may transmit the signal corresponding to the completion of the identification number setting to the master module and restart the processor when a signal corresponding to a restart is received from the master module through the first communication line.

According to some example embodiments, after the processor transmits the signal corresponding to the completion of the identification number setting to the master module, the slave module may receive a signal, which is transmitted by the master module to one or more slave modules including the lower slave module, through the first communication line and transmit the received signal to the second communication line.

According to some example embodiments, in an identification number assignment system, for sequentially assigning identification numbers of at least one slave module by sequentially controlling switches of the at least one slave module having the switches arranged on a communication line where a master module and the at least one slave module are connected in series, the system includes: a master module transmitting an identification number assignment signal and a switch control signal of the switch to the at least one slave module for assignment of identification numbers; and at least one slave module setting an identification number thereof by controlling the switch based on the identification number assignment signal and the switch control signal transmitted by the master module. In this case, the master module may transmit the identification number assignment signal to the at least one slave module to sequentially close switches included in each of the at least one slave module.

According to some example embodiments, the master module may transmit an identification number assignment mode entry request signal to the at least one slave module to open all switches included in each of the at least one slave module, and the identification number assignment mode entry request signal may include at least one of a signal corresponding to identification number initialization of the at least one slave module and a signal for opening a switch included in each of the at least one slave module.

According to some example embodiments, after transmitting the identification number assignment mode entry request signal, the master module may transmit an identification number assignment signal including a second identification number to be assigned to a first slave module to close a switch of the first slave module, and may receive a signal corresponding to completion of identification number setting, which is transmitted by the first slave module in response to the identification number assignment signal including the second identification number, and transmit an identification number assignment signal including a third identification number to be assigned to a second slave module that is a lower slave module adjacent to the first slave module.

According to some example embodiments, after receiving a signal corresponding to completion of identification number setting which is transmitted by the second slave module in response to the identification number assignment signal including the second identification number, the master module may transmit a signal corresponding to a restart to the at least one slave module on the communication line when identification number assignment of the at least one slave module is completed.

Other aspects, features, and characteristics other than those described above will become apparent from the accompanying drawings, the appended claims, and the detailed description of the disclosure.

BRIEF DESCRIPTION OF THE DRAWINGS

The above and other aspects, features, and characteristics of certain embodiments of the disclosure will be more apparent from the following description taken in conjunction with the accompanying drawings, in which.

DETAILED DESCRIPTION

Figure 1:
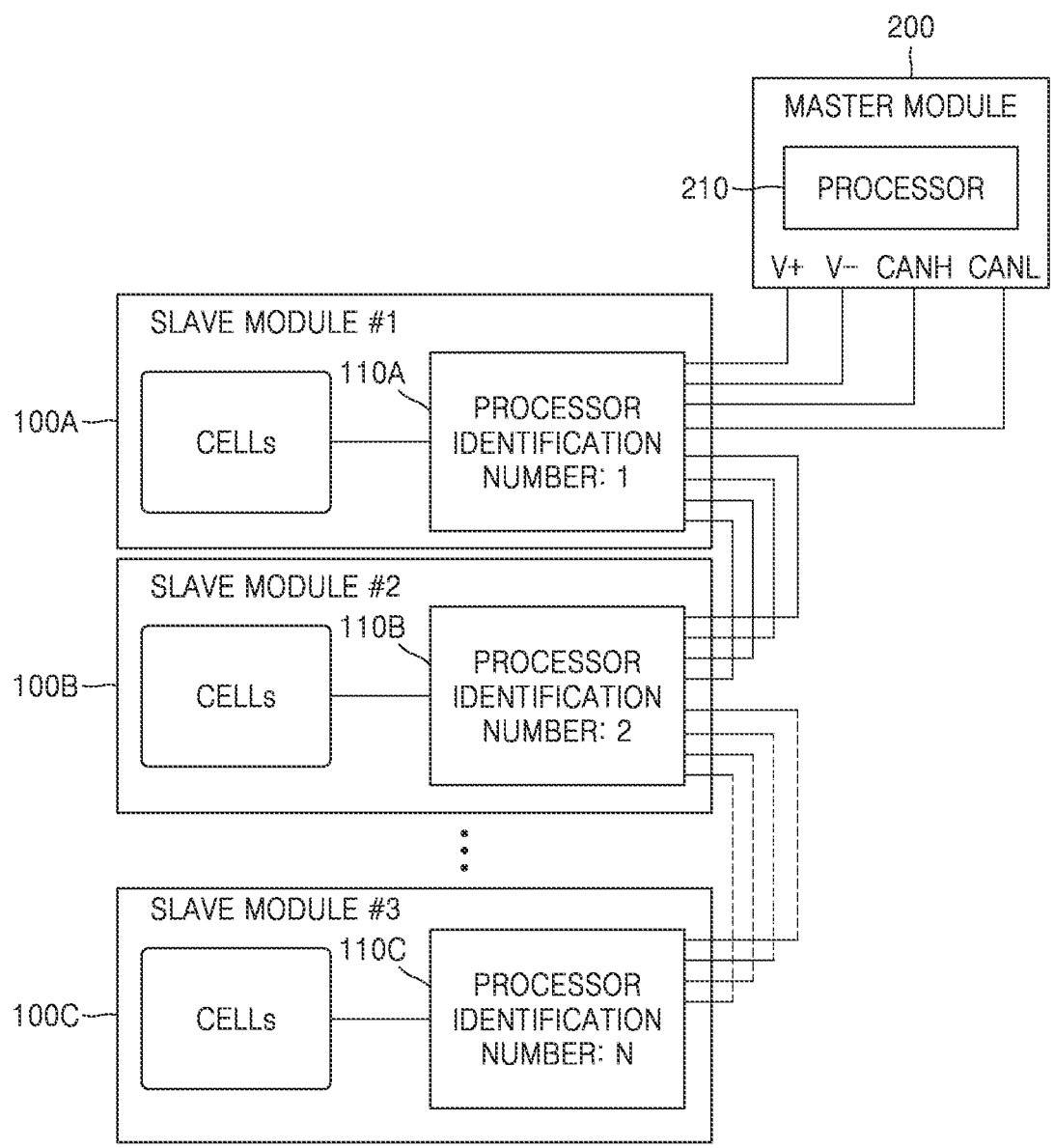
FIG. 1 is a diagram illustrating an example in which an identification number assignment system is applied to a battery pack, according to some example embodiments of the present disclosure.

Reference will now be made in more detail to embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

For example, particular shapes, structures, and features described herein may be modified from some embodiments to other embodiments without departing from the spirit and scope of the present disclosure. Also, it will be understood that the position or arrangement of individual components in each embodiment may be modified without departing from the spirit and scope of the present disclosure. Thus, the following detailed description should be considered in a descriptive sense only and not for purposes of limitation, and the scope of the present disclosure should be construed as including the appended claims and all equivalents thereof. In the drawings, like reference numerals will denote like elements throughout various aspects. That is, particular details described herein are merely examples. Different embodiments may vary from these example details and may still be contemplated within the spirit and scope of the present disclosure.

Although terms such as "first" and "second" may be used herein to describe various elements or components, these elements or components should not be limited by these terms. These terms are only used to distinguish one element or component from another element or component.

The terminology used herein is for the purpose of describing particular embodiments only and is not intended to limit the present disclosure. As used herein, the singular forms "a", "an", and "the" are intended to include the plural forms as well, unless the context clearly indicates otherwise. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

Hereinafter, embodiments of the present disclosure will be described in detail with reference to the accompanying drawings, and in the following description, like reference numerals will be used to denote like elements and redundant descriptions thereof will be omitted for conciseness.

Figure 2:
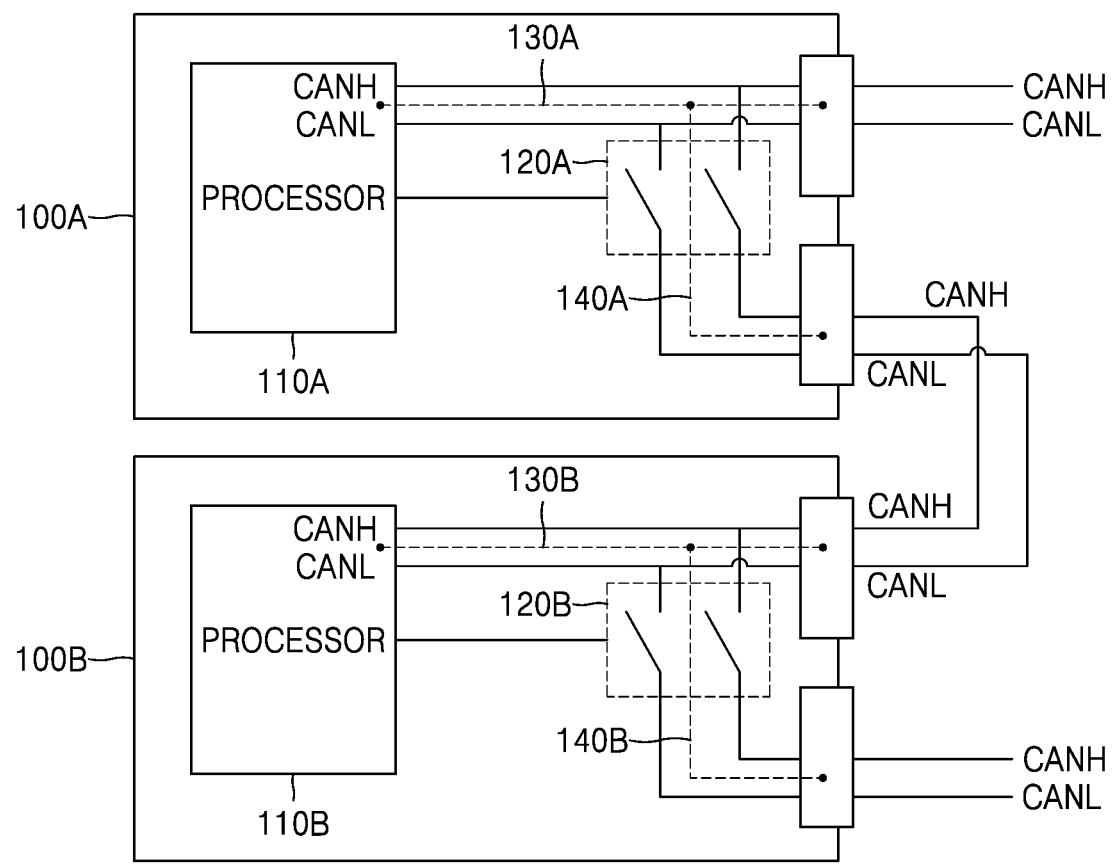
FIG. 2 is a diagram illustrating the internal configuration and connection relationship of slave modules 100A and 100B.

FIG. 1 is a diagram illustrating an example in which an identification number assignment system is applied to a battery system, according to some example embodiments of the present disclosure. FIG. 2 is a diagram illustrating the internal configuration and connection relationship of slave modules 100A and 100B. Hereinafter, a description will be given with reference to FIGS. 1 and 2 together.

First, referring to FIG. 1, the identification number assignment system according to some example embodiments of the present disclosure may include a master module 200 and the at least one slave module 100A, 100B, and 100C.

The master module 200 of the identification number assignment system according to some example embodiments of the present disclosure may sequentially control switches of at least one slave module 100A, 100B, and 100C to sequentially assign identification numbers to at least one slave module 100A, 100B, and 100C.

The master module 200 and the at least one slave module 100A, 100B, and 100C may be connected in series on a communication line, as illustrated in FIG. 1. In this case, the communication line may be, for example, a Controller Area Network (CAN) bus line for CAN communication and may be a communication line including a CANH (or CAN High) line and a CANL (or CAN Low) line as illustrated in the drawings. Meanwhile, the position of the master module 200 and/or the number of slave modules 100A, 100B, and 100C illustrated in FIG. 1 are merely examples, and embodiments according to the present disclosure are not limited thereto.

When the identification number assignment system according to some example embodiments of the present disclosure is applied to a battery system, the master module 200 may be a device for managing the battery system or a master battery pack (in this case, the master module 200 may further include a battery cell). Also, each of at least one slave module 100A, 100B, and 100C may be one or more sub battery packs included in the battery system.

When an identification number assignment system according to some example embodiments of the present disclosure is applied to a battery pack, a master module may be a master battery management system (BMS) managing the entire battery pack and at least one slave module 100A, 100B, and 100C may be each cell.

However, the above embodiments are merely examples, and the identification number assignment system according to example embodiments of the present disclosure may be applied to a system in which a master module manages a plurality of slave modules. As such, the identification number assignment system described herein may be applied to various systems in which a master module manages a plurality of slave modules, regardless of the broadness/narrowness of systems.

Hereinafter, for convenience of description, assuming that the identification number assignment system according to some example embodiments of the present disclosure is applied to a battery system, a device (or a master device) for managing the battery system will be referred to as "a master module 200" and each battery pack will be referred to as "at least one slave module 100A, 100B, and 100C".

The master module 200 according to some example embodiments of the present disclosure may assign identification numbers to at least one slave module 100A, 100B, and 100C and transmit/receive data to/from at least one slave module 100A, 100B, and 100C based on the assigned identification numbers. For example, the master device according to some example embodiments of the present disclosure may assign an identification number to each of at least one slave battery pack and transmit/receive data to/from at least one slave battery pack based on the assigned identification number.

As described above, when the identification number assignment system according to some example embodiments of the present disclosure is applied to a battery system, the master module 200 may assign an identification number of at least one slave module 100A, 100B, and 100C corresponding to each battery pack. Also, the master module 200 may receive data such as voltage, current, and State of Charge (SOC) of each pack from at least one slave module 100A, 100B, and 100C based on the assigned identification number.

The master module 200 may include a processor 210 for processing data or performing an operation. In this case, the processor 210 may include any type of device capable of processing data. For example, the processor 210 may include, for example, a data processing device that is embedded in hardware and has a physically structured circuit to perform a function represented by the command or code in a program.

As an example, the data processing device embedded in hardware may include any processing device such as a microprocessor, a central processing unit (CPU), a processor core, a multiprocessor, an application-specific integrated circuit (ASIC), or a field programmable gate array (FPGA); however, embodiments according to the present disclosure are not limited thereto.

Meanwhile, the master module 200 may be connected in series to at least one slave module 100A, 100B, and 100C through a communication line. In this case, as described above, the communication line may be, for example, a CAN bus line for CAN communication and may be a communication line including a CANH (or CAN High) line and a CANL (or CAN Low) line. Also, the master module 200 may include a communication port for connecting with each of the CANH line and CANL line.

In addition to the processor 210 described above, the master module 200 according to some example embodiments of the present disclosure may further include a memory for temporarily and/or permanently storing data processed by the processor 210. For example, the memory may temporarily and/or permanently store the identification number assigned to each of at least one slave module 100A, 100B, and 100C.

At least one slave module 100A, 100B, and 100C according to some example embodiments of the present disclosure may be sequentially assigned identification numbers by suitably controlling an internal switch under the control of the master module 200 described above.

The at least one slave module 100A, 100B, and 100C may include a first communication line for connecting its own processor to one of an adjacent upper slave module and a master module and a second communication line for connecting an adjacent lower slave module to the first communication line.

Also, at least one slave module 100A, 100B, and 100C according to some example embodiments of the present disclosure may include a switch that is arranged on the second communication line to control the communication connection between the first communication line and an adjacent lower slave module and a processor that controls an operation of the switch based on a signal received from the first communication line.

For example, referring to FIG. 2, a first slave module 100A, which is adjacent to and follows the master module 200, may include a first communication line 130A for connecting its own processor 110A to the master module 200. Also, the first slave module 100A may include a second communication line 140A that connects the first communication line 130A to a second slave module 100B, which is an adjacent lower slave module, and a switch 120A that is arranged on the second communication line 140A.

Meanwhile, each of the first communication line 130A and the second communication line 140A may include a plurality of lines (or circuits) connecting two objects to be connected. For example, when the communication line is a CAN bus line as in the above example, each of the first communication line 130A and the second communication line 140A may include a CANH (or CAN High) line and a CANL (or CAN Low) line. In this case, the switch 120A may include a plurality of switches for controlling the connection of the respective lines (or circuits). For example, when the second communication line 140A includes a CANH (or CAN High) line and a CANL (or CAN Low) line, the switch 120A may include a switch for controlling the connection of each of the CANH (or CAN High) line and the CANL (or CAN Low) line. However, the types of communication lines and/or the number of communication lines (or circuits) are merely examples, and the present disclosure is not limited thereto.

Similarly to the first slave module 100A, the second slave module 100B may include a first communication line 130B that connects its own processor 110B to the first slave module 100A. Also, the second slave module 100B may include a second communication line 140B that connects the first communication line 130B to a third slave module, which is an adjacent lower slave module, and a switch 120B that is arranged on the second communication line 140B.

Because each component of the second slave module 100B is substantially the same as each component of the first slave module 100A, redundant descriptions of each component of the second slave module 100B will be omitted for conciseness.

Meanwhile, in the present disclosure, the "line" may mean a conductive line for electrically connecting two points. Also, the "switch" may be any means of controlling the connection between two contact points based on a control signal and may include, for example, any one of a field effect transistor (FET), a bipolar junction transistor (BJT), an insulated gate bipolar transistor (IGBT), and a relay. However, this is merely an example and the present disclosure is not limited thereto.

Hereinafter, a method of assigning identification numbers of at least one slave module 100A, 100B, and 100C by the master module 200 will be described with reference to FIG. 3.

Figure 3:
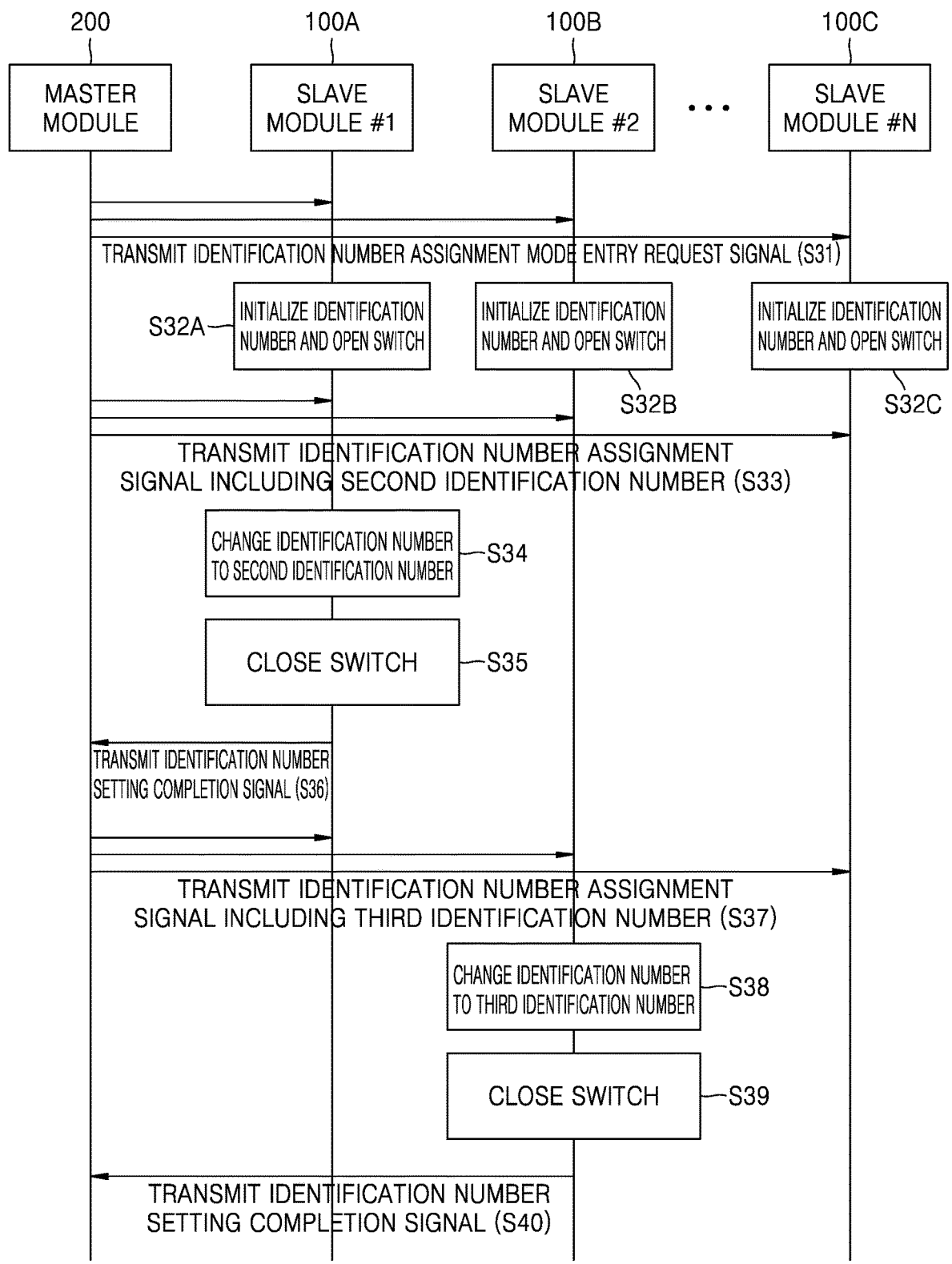
FIG. 3 is a flowchart illustrating a method of assigning identification numbers of at least one slave module 100A, 100B, and 100C by the identification number assignment system by using a master module 200, according to some example embodiments of the present disclosure.

FIG. 3 is a flowchart illustrating a method of assigning identification numbers of at least one slave module 100A, 100B, and 100C by the identification number assignment system by using the master module 200, according to some example embodiments of the present disclosure.

The master module 200 according to some example embodiments of the present disclosure may transmit an identification number assignment mode entry request signal to at least one slave module 100A, 100B, and 100C (operation S31). In this case, the identification number assignment mode entry request signal may be a signal for switching at least one slave module 100A, 100B, and 100C to a state capable of number assignment and may include at least one of a signal corresponding to the identification number initialization of at least one slave module 100A, 100B, and 100C and a signal for opening the switch included in each of at least one slave module 100A, 100B, and 100C.

Each of at least one slave module 100A, 100B, and 100C according to some example embodiments of the present disclosure may initialize its own identification number and open the switch in response to the reception of the identification number assignment mode entry request signal received in operation S31 (operations S32A, S32B, and S32C).

For example, when the state of the first slave module 100A is a certain state, the processor 110A of the first slave module 100A may set its own identification number to a first identification number (e.g., a preset value such as 0XFF), receive an open signal of the switch 120A from the master module 200, open the switch 120A, and maintain the switch 120A in an open state.

In this case, the "certain state" may mean any one of a state within a certain time interval (e.g., 100 seconds) from a time when the power supply of the first slave module 100A is changed to an on state and a state in which a signal corresponding to identification number initialization is received from the master module 200.

Likewise, when the state of the second slave module 100B is a certain state, the processor 110B of the second slave module 100B may set its own identification number to a first identification number (e.g., a preset value such as 0XFF), receive an open signal of the switch 120B from the master module 200, open the switch 120B, and maintain the switch 120B in an open state.

Subsequently, the master module 200 according to some example embodiments of the present disclosure may transmit an identification number assignment signal including a second identification number (e.g., 0X01) to be assigned to at least one slave module 100A, 100B, and 100C (operation S33).

Meanwhile, because all of the switches included in each of at least one slave module 100A, 100B, and 100C are opened in operations S32A, S32B, and S32C, the identification number assignment signal including the second identification number may be actually transmitted only to the first slave module 100A.

In other words, upon receiving the identification number assignment signal, the first slave module 100A may receive the identification number assignment signal including the second identification number from the master module 200 through the first communication line 130A in a state where the switch 120A is opened in operation S32A.

In response to the identification number assignment signal received in operation S33, the first slave module 100A according to some example embodiments of the present disclosure may set its own identification number to the second identification number (operation S34), close the switch 120A (operation S35), and transmit a signal corresponding to the completion of identification number setting to the master module 200 through the first communication line 130A (operation S36).

When the identification number assignment signal is received from the master module 200, at least one slave module 100A, 100B, and 100C according to some example embodiments of the present disclosure may change and set its own identification number to the identification number included in the identification number assignment signal only when its own identification number is the first identification number. Thus, in operation S34, the first slave module 100A may change and set its own identification number to the second identification number only when its own identification number is the first identification number.

The master module 200 according to some example embodiments of the present disclosure may receive the signal corresponding to the completion of the identification number setting transmitted by the first slave module 100A in operation S36 and transmit an identification number assignment signal including a third identification number (e.g., 0X02) to be assigned to the second slave module 100B that is a lower slave module adjacent to the first slave module 100A (operation S37).

Meanwhile, because all of the switches included in each of at least one slave module 100A, 100B, and 100C are opened in operations S32A, S32B, and S32C and the switch 120A of the first slave module 100A is closed in operation S35, the identification number assignment signal including the third identification number may be transmitted only to the first slave module 100A and the second slave module 100B.

As described in operation S34, when the identification number setting is completed, at least one slave module 100A, 100B, and 100C according to some example embodiments of the present disclosure may not be affected by the identification number assignment signal received thereafter from the master module 200 (because at least one slave module 100A, 100B, and 100C may change and set its own identification number to the identification number included in the identification number assignment signal only when its own identification number is the first identification number, as described above). Also, upon completing the identification number setting thereof, the slave modules may receive a signal transmitted by the master module 200 through the first communication line and transmit the received signal to the second communication line.

Thus, the first slave module 100A may maintain the second identification number set in operation S34 in spite of the identification number assignment signal including the third identification number (e.g., 0X02) transmitted by the master module 200. Also, the first slave module 100A may receive the identification number assignment signal including the third identification number (e.g., 0X02) transmitted by the master module 200 through the first communication line 130A and transmit the same to the second slave module 100B through the second communication line 140A.

In response to the identification number assignment signal received in operation S37, the second slave module 100B according to an embodiment of the present disclosure may set its own identification number to the third identification number (operation S38), close the switch 120B (operation S39), and transmit a signal corresponding to the completion of identification number setting to the master module 200 through the first communication line 130B (operation S40).

In this case, in operation S38, the second slave module 100B may determine whether its own identification number is the first identification number and change and set its own identification number to the third identification number only when its own identification number is the first identification number.

The master module 200 and the at least one slave module 100A, 100B, and 100C according to some example embodiments of the present disclosure may assign the identification numbers of all slave modules by repeating a process of operations S37 to S40 by the number of remaining slave modules.

Meanwhile, when the identification number assignment of at least one slave module 100A, 100B, and 100C is completed, the master module 200 according to some example embodiments of the present disclosure may transmit a signal corresponding to a restart to at least one slave module 100A, 100B, and 100C through a communication line.

When the signal corresponding to the restart is received from the master module 200, at least one slave module 100A, 100B, and 100C may restart their own processors 110A, 110B, and 110C to operate the identification number assignment system normally.

In a related art system including at least one slave module, a master module may assign identification numbers to at least one slave module by using a separate communication line for identification number assignment. However, such a system may require not only high manufacturing cost, but also increased hardware complexity, thus causing difficulty in maintenance and management thereof.

As described above, embodiments according to the present disclosure may enable identification number assignment and data transmission/reception through a single communication line simply by allowing each slave module to manage the opening/closing of a communication line.

According to some example embodiments of the present disclosure, identification number assignment and data transmission/reception may be performed through a single communication line by allowing each slave module to manage the opening/closing of a communication line.

Also, the identification numbers of a plurality of slave modules may be assigned more efficiently, and the hardware complexity of a system including a plurality of slave modules may be reduced.

Example implementations described herein are merely example embodiments, and do not limit the scope of the present disclosure in any way. For the sake of conciseness, descriptions of related art electronic configurations, control systems, software, and other functional aspects of the systems may be omitted. Also, the connection lines or connection members between various components illustrated in the drawings represent examples of functional connections and/ or physical or logical connections between the various components, and various alternative or additional functional connections, physical connections, or logical connections may be present in practical apparatuses. Also, no element may be essential to the practice of the present disclosure unless the element is particularly described as "essential" or "critical".

It should be understood that example embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. A slave module connected in series with a master module on a communication line, wherein the slave module controls a switch to sequentially assign identification numbers of the slave module and lower slave modules, the slave module comprising:
a first communication line connecting a processor to one of an adjacent upper slave module and the master module;
a second communication line connecting an adjacent lower slave module to the first communication line;
a switch on the second communication line and controlling a communication connection between the first communication line and the adjacent lower slave module; and
the processor controlling an operation of the switch based on a signal received from the first communication line, wherein the processor closes the switch in response to setting of an identification number thereof being completed based on an identification number received from the master module through the first communication line,
wherein the processor in response to receive an identification number assignment signal including an identification number through the first communication line in a state where the switch is opened, set an identification number of the slave module as the received identification number, close the switch, and transmit a signal corresponding to completion of identification number setting to the master module through the first communication line.

2. The slave module of claim 1, wherein the processor, in response to a state of the slave module being a certain state:
sets the identification number thereof to an initial identification number; and
receives an open signal of the switch from the master module, opens the switch, and maintains the switch in an open state.

3. The slave module of claim 2, wherein the certain state is any one of a state within a certain time interval from a time when a power supply of the slave module is changed to an on state and a state in which a signal corresponding to identification number initialization is received from the master module.

4. The slave module of claim 1, wherein the processor, in response to the identification number assignment signal being received from the master module: changes and sets the identification number thereof to a second identification number only when the identification number thereof is the first identification number.

5. The slave module of claim 1, wherein the processor:
transmits the signal corresponding to a completion of the identification number setting to the master module; and
restarts the processor in response to a signal corresponding to a restart being received from the master module through the first communication line.

6. The slave module of claim 1, wherein,
after the processor transmits the signal corresponding to a completion of the identification number setting to the master module,
the slave module receives a signal, which is transmitted by the master module to one or more slave modules including the adjacent lower slave module, through the first communication line and transmits the received signal to the second communication line.

7. An identification number assignment system configured to:
sequentially assign identification numbers of at least one slave module by sequentially controlling switches of the at least one slave module having the switches arranged on a communication line where a master module and the at least one slave module are connected in series, the identification number assignment system comprising:
a master module that transmits an identification number assignment signal and a switch control signal of the switch to the at least one slave module for assignment of identification numbers; and
at least one slave module that sets an identification number thereof by controlling the switch based on the identification number assignment signal and the switch control signal transmitted by the master module,
wherein the master module transmits the identification number assignment signal to the at least one slave module to sequentially close switches included in each of the at least one slave module,
wherein the master module transmits an identification number assignment mode entry request signal to the at least one slave module to open all switches included in each of the at least one slave module, and
wherein the identification number assignment mode entry request signal includes at least one of a signal corresponding to identification number initialization of the at least one slave module and a signal for opening a switch included in each of the at least one slave module.

8. The identification number assignment system of claim 7, wherein the master module, after transmitting the identification number assignment mode entry request signal:
transmits an identification number assignment signal including a third identification number to be assigned to a first slave module to close a switch of the first slave module;
receives a signal corresponding to completion of identification number setting, which is transmitted by the first slave module in response to the identification number assignment signal including a second identification number; and
transmits an identification number assignment signal including a third identification number to be assigned to a second slave module that is a lower slave module adjacent to the first slave module,
wherein the master module, after receiving a signal corresponding to completion of identification number setting which is transmitted by the second slave module in response to the identification number assignment signal including the second identification number: transmits a signal corresponding to a restart to the at least one slave module on the communication line in response to identification number assignment of the at least one slave module being completed.

* * * * *